Patented June 3, 1941

2,244,477

UNITED STATES PATENT OFFICE 2,244,477

RECOVERY OF BASIC CALCIUM HYPOCHLORITE COMPOUNDS

Heinrich Reitz and Hans Ehlers, Bitterfeld, Germany, assignors, by mesne assignments, to Pen-Chlor, Incorporated, Philadelphia, Pa., a corporation of Delaware No Drawing. Application May 24, 1938, Serial No. 209,727. In Germany June 8, 1937

2 Claims. (Cl. 23—86)

This invention relates to a process for the production of basic calcium hypochlorite compounds.

In accordance with a known process, basic calcium hypochlorites can be precipitated from lyes which contain calcium chloride in addition to available chlorine, by the addition of lime. Such lyes are produced, for example, when chloride of lime (bleaching powder) is treated with water to produce a slurry; they are also obtained in the form of a mother liquor in the production of calcium hypochlorite by the chlorination of concentrated lime slurries until neutral calcium hypochlorite is precipitated, after separation of the latter. These lyes constitute solutions of calcium chloride which are saturated with calcium hypochlorite. The problem of recovering the available chlorine still contained in lyes of this kind, is of considerable importance to the economy of processes of the foregoing kind.

The recovery of the available chlorine content of such lyes by precipitation with lime has, in practice, however, always failed hitherto owing to the fact that the precipitated basic calcium hypochlorite compounds which initially form a fine-powdery deposit, rapidly cake together into more or less cohesive masses, so that their separation from the mother lye becomes impracticable; while in consequence of their greatly varying content of free calcium hydrate, they possess an indefinite composition.

It is an object of the present invention to improve the aforesaid known process in such a manner that the basic calcium hypochlorite precipitates retain their original fine-powdery or granular condition so as to enable them to be easily separated from the calcium chloride mother lye.

It has now been ascertained in accordance with the present invention that the solidification of the deposit is due to the presence therein of calcium oxychloride, which is formed at the temperatures employed, and that the foregoing drawbacks may be avoided by treating solutions of the first mentioned type with lime at temperatures above about 40° C., preferably at from 80 to 90° C. The hardening of the precipitated compounds is thus avoided, and, on the contrary, readily filtrable basic calcium hypochlorite compounds are formed, which remain powdery or fine-grained, and the lime content of which is in complete accordance with the theoretical content following from the known solubility of the basic hypochlorite compounds, and of hydrate of lime, respectively. Moreover, when working in this manner, the available chlorine content of the residual lye is reduced to a considerably greater extent than when working at ordinary temperature, since 80% and more of the available chlorine of the originating lye is recovered in the form of basic calcium hypochlorite compounds. These differences in behaviour are apparently due to the fact that the hot lye containing calcium chloride and calcium hypochlorite possesses a greater solvent power for calcium hydrate.

In spite of the higher range of temperatures employed in the present process, no noticeable loss of available chlorine occurs through the decomposition of hypochlorite.

The addition of lime is preferably so proportioned that 2 mols. of calcium hydrate are added for 1 mol. of available chlorine contained in the lye to be treated. The calcium hydrate may be added in the form of a dry powder; it is however preferable to add it as an aqueous suspension in the proportion of about 6 parts by weight of water to 5 parts by weight of calcium hydrate, whereby the filtrability of the product is further improved.

The following examples will serve to illustrate the process of the present invention:

Example I 1000 parts by volume, corresponding to 1307 parts by weight, of a lye containing calcium hypochlorite and calcium chloride, comprising 272 grms. per litre of total chlorine and 96 grms. per litre of available chlorine, were suspended in the same amount by weight of water, with the addition of 100 parts by weight of calcium hydrate, heated to 80–90° C. and centrifuged while still hot. 530 parts by weight of filter cake, containing 16% (=84.6 parts by weight) of available chlorine and 730 parts by volume of mother lye containing 16 grms. per litre=11.7 parts by weight of available chlorine were obtained. Of the 96 grms. per litre of available chlorine contained in the originating lye, 84.6 grms. per litre=89% were thus recovered in the solid product obtained. Analysis of the latter gave the following figures:

| | Per cent |
|---|---|
| Available chlorine content | 34.4 |
| Total chlorine content | 23.5 |
| CaO | 30.5 |

Example II 1000 parts by volume of a lye containing 286 grms. per litre of total chlorine and 100.8 grms. per litre of available chlorine were mixed with 121 parts by weight of calcium hydrate and heated to 80° C. After separation of the precipitate from the liquid phase, 411 parts by weight of filter cake containing 20.2% of available chlorine and 780 parts by volume of lye containing 19.9 grms. per litre of available chlorine were obtained. Of the 100.8 grms. per litre of available chlorine in the originating lye, 82.8 grms. were thus obtained in the solid product, which corresponds to a yield of 82%.

We claim:

1. A process for the recovery of calcium hypochlorite compounds from solutions containing substantial amounts of calcium chloride in addition to available chlorine, which comprises causing calcium hydrate to react with such lyes at temperatures from about 80 to about 90° C., and thereafter separating the precipitated basic calcium hypochlorite compounds from the residual lye while maintaining such temperatures.

2. A process for the recovery of calcium hypochlorite compounds from solutions containing substantial amounts of calcium chloride in addition to available chlorine, which comprises adding an aqueous suspension of calcium hydrate to such lyes so as to cause reaction between the available chlorine content of the lye and the calcium hydrate at temperatures from about 80 to about 90° C., and thereafter separating the precipitated basic calcium hypochlorite compounds from the residual lye while maintaining such temperatures.

HEINRICH REITZ.
HANS EHLERS.